United States Patent [19]

Bonniaud et al.

[11] 4,009,990

[45] Mar. 1, 1977

[54] METHOD FOR IMPROVING THE INCORPORATION OF RADIOACTIVE WASTES INTO A VITREOUS MASS

[75] Inventors: Roger Bonniaud, Goudargues; Antoine Jouan, Bagnols-sur-Ceze; Claude Sombret, Courthezon, all of France

[73] Assignee: Commissariat a l'Energie Atomique, Paris, France

[22] Filed: Feb. 27, 1975

[21] Appl. No.: 554,231

[30] Foreign Application Priority Data

Feb. 28, 1974  France .................................. 74.06887

[52] U.S. Cl. .................................. 432/13; 432/197
[51] Int. Cl.² .................................. F27B 14/00; F27B 15/00
[58] Field of Search ............ 432/13, 72, 106, 112, 432/197

[56] References Cited

UNITED STATES PATENTS

| | | | |
|---|---|---|---|
| 1,633,839 | 6/1927 | Hindshaw | 432/72 |
| 2,240,757 | 5/1941 | Buck | 432/112 |
| 2,648,535 | 8/1953 | Ramsay et al. | 432/112 X |
| 2,680,084 | 6/1954 | Ryan | 432/112 X |
| 3,266,879 | 8/1966 | Kroyer | 432/13 |
| 3,295,930 | 1/1967 | Swanson et al. | 432/106 |
| 3,350,077 | 10/1967 | Christensen | 432/106 |

*Primary Examiner*—John J. Camby
*Attorney, Agent, or Firm*—Lane, Aitken, Dunner & Ziems

[57] ABSTRACT

A calcinating device, or calcinator, is provided with a rotatable drum, the axis of which is slightly inclined with respect to the horizontal, and is adapted to be mounted inside a furnace and to be used for mixing and heating a mixture of sintered glass pieces and of radioactive wastes. The calcinator has, at the extremities thereof, two flanges to which are respectively fixed an upper sleeve on a level with which open an inlet conduit for the radioactive liquids, a conduit connected to a hopper for feeding sintered glass and a gas exhaust conduit, and a lower sleeve, the extension of which away from said drum is provided with an opening for expelling the calcinate obtained and transferring it to a smelting furnace. The calcinator is further provided with means for rotating and sealing same.

3 Claims, 1 Drawing Figure

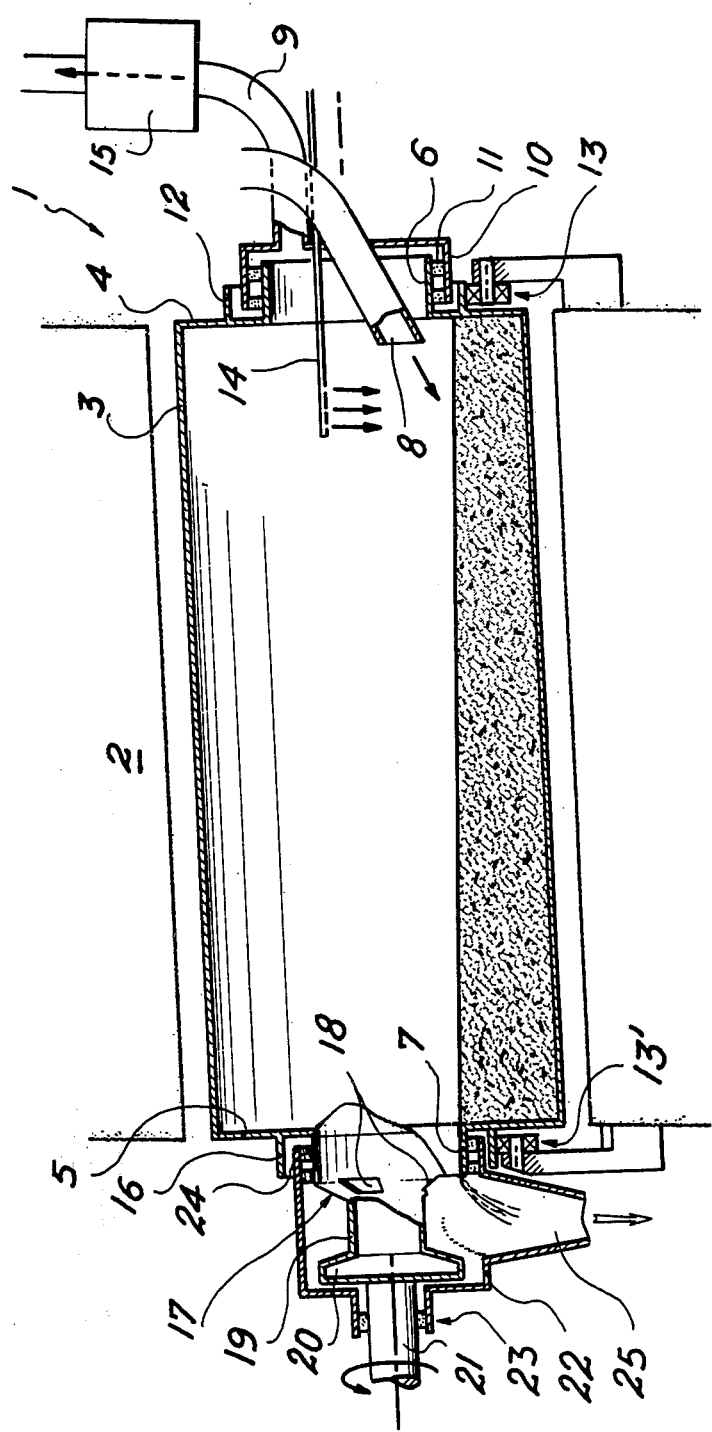

METHOD FOR IMPROVING THE INCORPORATION OF RADIOACTIVE WASTES INTO A VITREOUS MASS

The present invention relates to a method for improving the incorporation of radioactive wastes into a vitreous mass, as well as to a calcinator for carrying out that method.

The storage of radioactive wastes is a problem of ever growing importance and it has already been suggested to solve that problem by incorporating the radioactive wastes into glass and melting the whole so as to obtain a vitreous or nearly vitreous mass capable of retaining the radioactive elements and, thereby, preventing the environment from being contaminated.

According to the present invention, such a treatment is improved by providing a calcination step prior to the melting system proper and, to this end, use is made of a calcinating device of special design.

More specifically, one aspect of the present invention is a method for incorporating radioactive wastes into a vitrified mass, said method comprising the steps of simultaneously and continuously feeding the inlet of a calcinator with radioactive wastes and glass pieces, mixing said radioactive wastes and glass pieces and heating same so as to establish a temperature gradient between the inlet and the outlet of said calcinator and in order that the thus-obtained mixture forms a moving bed of sintered glass, the radioactive waste content of which increases from the calcinator inlet to the calcinator outlet.

Another aspect the present invention is a calcinating device, or calcinator provided with a rotatable drum, the axis of which is slightly inclined with respect to the horizontal, and adapted to be mounted inside a furnace and to be used for mixing and heating a mixture of sintered glass pieces and of radioactive wastes, said calcinator comprising, at the extremities thereof, two flanges to which are respectively fixed an upper sleeve on a level with which open an inlet conduit for the radioactive liquids, a conduit connected to a hopper for feeding sintered glass and a gas-exhaust conduit, and a lower sleeve, provided with an extension for expelling the calcinate and transferring said calcinate to a smelting furnace. The calcinator is also provided with means for rotating and sealing same. Accordingly, the present invention offers the following advantages:

Since, the bed of treated substances is moving, it does not form a slurry likely to choke up the drum and, on the other hand, serves to clean the calcinator, thus rendering it unnecessary to resort to mechanical means.

The rotation speed is low enough to prevent the bed from adhering to the drum walls while, at the same time, it is high enough to maintain the bed in a stirred state, thus avoiding any risk of clogging. The calcinator can therefore be operated continuously.

The hot calcinated product issuing from the calcinator is homogeneous and melts more rapidly than would a mixture of a sintered product and a separately calcinated product.

Other features of the present invention will appear from the following description of a specific embodiment of the calcinator, with reference to the accompanying sole FIGURE showing that calcinator diagrammatically.

As shown in the FIGURE, a calcinator 1, is mounted inside an electric furnace 2, the outer walls of which are vertical. Calcinator 1 essentially comprises a stainless steel drum 3, the axis of which is slightly inclined with respect to the horizontal. Said drum 3 is provided, at the extremities thereof, with two flanges 4 and 5, to which are fixed an upper sleeve 6 and a lower sleeve 7, respectively. A conduit 8 connected to a hopper for feeding a sintered product, and a conduit 9 for the exhaust of gases, both open into an end piece 10 which is fitted around upper sleeve 6. Sealing joints, or gaskets, 11 provide a tight connection between upper sleeve 6 and end piece 10. Flange 4 comprises a sleeve 12 resting against a rolling track 13. A radioactive solution feed conduit 14, provided with holes at several places in the vicinity of its extremity, is axially mounted through end piece 10. The outlet of conduit 9 communicates with a filtering column 15.

Similarly, sleeve 16 rests against a rolling track 13', co-operating with rolling track 13 to support drum 3.

Sleeve 7 is extended away from drum 3 by a frusto conical wall 17, in which an opening 18 is provided for expelling the calcinate. Frustoconical wall 17 is extended to form a cylindrical portion 19, integral with a disk 20 and a shaft 21. Finally, a chamber 22, enclosing a portion of shaft 21 and sleeve 7, is sealed by means of joints, or gaskets, 23 and 24, and bottom 25 is formed into a chute which delivers the calcinated product toward the smelting furnace.

The calcinator is rotatively driven by a motor (not shown) adapted to cause shaft 21 to rotate. Rolling track 13' is mounted at a level slightly lower than that of rolling track 13, so that the slant of the axis of rotation of shaft 21 is from about 3 to 5%.

The sintered product, including glass pieces in the form of beads or chips, is fed through conduit 8 into the calcinator upper or higher end where the temperature is about 120° C; said sintered product then mixes with the radioactive liquid which is fed through conduit 14 and forms a shower.

Because of the calcinator slant and of its rotation, the radioactive liquid and the sintered product, as soon as they have entered the calcinator, meet to form a bed which is continuously moving toward the calcinator outlet, where the temperature is about 400° C.

At the exit of the calcinator, the calcinated substance has formed an even coating on the sintered glass beads, and the mixture, perfectly homogeneous and accordingly adapted to lend itself to melting, flows over sleeve 7 and is expelled through portion 18 by gravity when said portion 18 is in its lowest position. Finally, that mixture flows through hopper 25, to feed the smelting furnace in continuous fashion.

By way of example, excellent performance was achieved with a calcinator having the following physical dimensions: drum length, 800 mm; drum diameter, 300 mm; and operating under the following conditions: bed weight, 10 Kg; furnace power, 8 KW; radioactive liquid flow rate, 5 liters/hour.

What is claimed is:

1. In a process for incorporating radioactive waste into glass by melting glass and the waste together in a smelting furnace to form a vitrified mass, the improvement consisting of pretreating the glass and waste to form a calcinated feed for the smelting furnace by:
simultaneously and continuously feeding the radioactive waste in liquid form and particulate glass into the inlet of a rotating cylinder inclined with respect to the horizontal to form a moving bed of a mixture of particulate glass and radioactive waste; and
heating said mixture within the rotating cylinder to produce a calcinate, suitable for feeding the smelting furnace, in the form of a coating on the glass particles.

2. The method of claim 1 wherein the heating is such that a temperature gradient is established along the length of the rotating furnace with an inlet temperature of about 120° C and an outlet temperature of about 400° C.

3. The method of claim 1, wherein said particulate glass is in the form of balls, beads or chips.

* * * * *